United States Patent [19]

Larsson

[11] 4,215,354
[45] Jul. 29, 1980

[54] SUPPRESSION OF CROSS-COUPLING IN MULTI-ORIFICE PRESSURE PULSE DROP-EJECTOR SYSTEMS

[75] Inventor: Stig-Göran Larsson, Carrollton, Tex.

[73] Assignee: Xerox Corporation, Stamford, Conn.

[21] Appl. No.: 963,475

[22] Filed: Nov. 24, 1978

[51] Int. Cl.² .......................................... G01D 15/18
[52] U.S. Cl. .............................................. 346/140 R
[58] Field of Search ............................ 346/75, 140 R

[56] References Cited

U.S. PATENT DOCUMENTS

| 4,024,544 | 5/1977 | Vernon | 346/140 R X |
| 4,104,645 | 8/1978 | Fischbeck | 346/140 R |
| 4,121,227 | 10/1978 | Fischbeck et al. | 346/140 R |

Primary Examiner—George H. Miller, Jr.

[57] ABSTRACT

In a multi-orifice drop-ejecting system, several fluidic circuits are connected by fluid passages, for example, to a common fluid supply or to the interconnections required in a fluid coincidence system. A pressure pulse directed to one fluid channel can, through "cross-coupling", be transmitted to another channel causing drop ejection where there should have been none. A system is described for reducing or eliminating this cross-coupling by the establishment of high flow-impedance areas within the fluid circuits.

3 Claims, 8 Drawing Figures

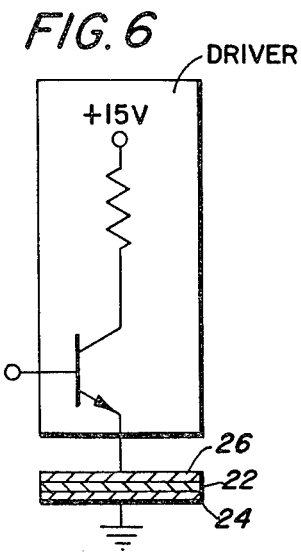

SUPPRESSION OF CROSS-COUPLING IN MULTI-ORIFICE PRESSURE PULSE DROP-EJECTOR SYSTEMS

DESCRIPTION OF THE INVENTION

This invention relates to a multiple ink jet printing system, which expresses droplets of a liquid, e.g., ink, through certain ink jet orifices upon a demand, which is predetermined in accordance with an image to be printed. The system of the present invention is particularly applicable to the systems described in U.S. Pat. No. 4,104,645 issued Aug. 1, 1978, to Kenneth H. Fischbeck, the disclosure of which is incorporated herein by reference.

It is an object of this invention to provide a coincidence ink jet system wherein fluid displacement, caused by pressure pulses from two transducer chambers being coincident at a particular orifice, effects droplet expression from the orifice without "cross-coupling" to other orifices. By "cross-coupling" is meant that a pressure pulse developed in one chamber or channel is transmitted to other chambers or channels causing drops to be expressed where none should be expressed resulting in poor quality images or, in severe cases, making the system virtually inoperable.

Other objects of the invention will become apparent from the following description with reference to the drawings wherein:

FIG. 6 is a representation of an electronic driver connected to a piezoelectric member which may be utilized as a pressure pulse generator.

FIG. 7 is a representation of an electronic matrix system illustrating the principles of a coincident ink jet system.

FIG. 8 is a representation of a fluid circuit, which shows how the various chambers, channels and orifices are interconnected.

In the various drawings, similar parts are given identical designations.

Figure 1:
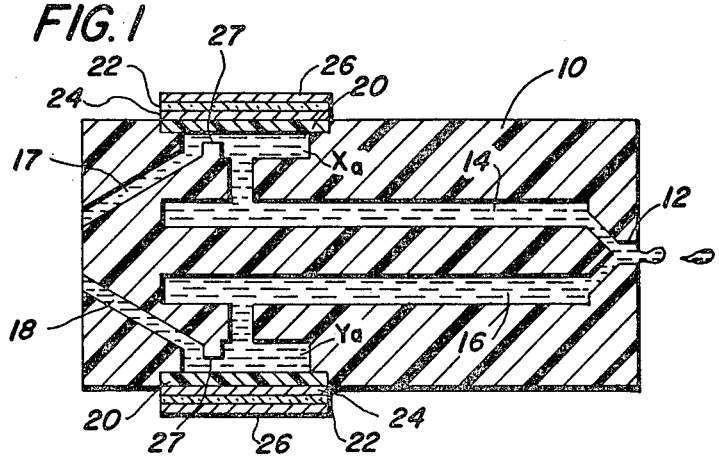
FIG. 1 is a cross-sectional view of an ink jet assembly for one system in which the present invention may be utilized.

Referring now to FIG. 1, an ink jet housing 10 has a droplet outlet orifice 12 and fluid pressure passages 14 and 16 communicated with cylindrical transducer chambers $X_a$ and $Y_a$, respectively. The passages 14 and 16 intersect each other at the orifice 12, which is the only desired communication, i.e., connection between the passages. Fluid replenishing passages 17 and 18 communicate fluid from a common reservoir or passage (see line 60 in FIG. 8) to a respective one of the transducer chambers $X_a$ and $Y_a$. Each chamber $X_a$, $Y_a$ is preferably sealed by a flat flexible layer 20 bonded to the housing 10. In operation, the transducer chambers and passages 14 and 16 are completely filled with liquid ink. A piezoelectric ceramic member 22 is sandwiched between and bonded to a pair of electrodes 24 and 26 with the electrode 24 being bonded to the layer 20, thereby effectively bonding the piezoelectric member 22 thereto. The piezoelectric member 22 is polarized during the manufacture thereof to contract in a plane parallel to the plane of the flat surface of flexible layer 20 when excited by application of a voltage difference across the conductive members 24 and 26. Contraction of the piezoelectric member 22 will cause the flexible layer 20 to buckle into chambers $X_a$ and $Y_a$, thereby decreasing the volume of the respective chamber and effecting pressure on the liquid ink in the chamber. The housing 10 and flexible layer 20 may be, e.g., glass or plastic.

When the piezoelectric member for either transducer $X_a$ or $Y_a$ is activated, a fluid pressure pulse will occur in a respective one of passages 14 and 16 causing displacement of ink along the respective passage. The voltage potential applied across the piezoelectric member for each transducer chamber $X_a$ and $Y_a$ is of such magnitude and duration that the fluid displacement and fluid velocity effected by a pressure pulse generated by each transducer chamber in a respective fluid pressure passage 14 or 16 is insufficient to express a droplet from the orifice 12. But the combined fluid displacement and fluid velocity, which is the result of the pressure pulse generated by transducer chamber $X_a$ and the pressure pulse generated by transducer chamber $Y_a$ being coincident at the orifice 12, will result in a droplet being expressed from the orifice 12. In practice it has been learned that even where only chamber $X_a$ has been reduced in volume by the action of the piezoelectric member 22, a droplet may be ejected from orifice 12. It has been found that a pressure pulse from area $X_a$ will travel through channel 17 to its connection with channel 18 where it may be reinforced by other unwanted pressure pulses from other transducers, travel through channel 18, through transducer chamber $Y_a$, passage 16 and cause a drop to be ejected from orifice 12 even though transducer chamber $Y_a$ was not pulsed. To prevent this cross-coupling, transducer chambers $X_a$ and $Y_a$ are designed to present a substantial impedance or resistance to the transmittal of a pressure pulse through the transducer chamber. Thus, only when the piezoelectric members for both transducer chambers $X_a$ and $Y_a$ are activated in such a manner that pressure pulses generated by the respective transducers coincide at the orifice 12 will an ink droplet be expressed from orifice 12.

To provide this increased impedance, at least two methods may be utilized. The first is to make chambers $X_a$ and $Y_a$ so shallow that the walls of the chamber provide significant resistance because of wall-fluid interface effects, e.g., friction. Typical chamber thicknesses, i.e., liquid depths, would range from as low as one micron to an upper limit of about 200 microns for normal fluid inks and chamber sizes typically utilized in the system described in more detail herein. A satisfactory result, for example, has been obtained using a chamber measuring 100 microns in thickness. A second method is to use barriers interposed between the inlets and outlets to the chambers $X_a$ and $Y_a$ as shown as 27 in FIG. 1. These barriers 27 provide resistance to unwanted pressure pulse transmission through the chambers. The amount of space necessary to pass sufficient fluid for operation, but insufficient to pass significant unwanted pressure pulses, is readily determined by testing in actual operation.

Figure 2:
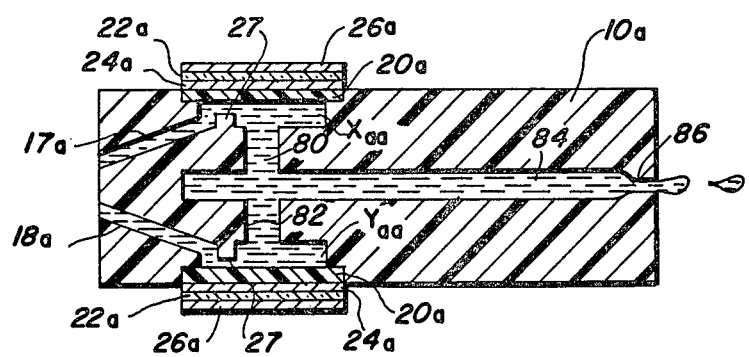
FIG. 2 shows a modification of the ink jet assembly disclosed in FIG. 1 in which the present invention may be also be utilized.

FIG. 2 shows a modification of the embodiment of FIG. 1. Those elements which are the same as in the embodiment of FIG. 1 are designated by the same reference numerals, only with an "a" affixed thereto. In this embodiment, a pair of fluid pressure passages 80 and 82 lead from a respective transducer chamber $X_{aa}$ and $Y_{aa}$ to an outlet passage 84, which, in turn, terminates at a droplet outlet orifice 86. The potential difference applied across the piezoelectric member for each transducer chamber $X_{aa}$ and $Y_{aa}$ is of such magnitude and duration that the fluid displacement and velocity effected by a pressure pulse generated in a respective fluid pressure passage 80 and 82 is insufficient by itself to express a droplet from the orifice 86. But the combined fluid displacement and velocity, which results from pulsing both chambers $X_{aa}$ and $y_{aa}$ being coincident at the orifice 86, will result in a droplet being expressed from the orifice 86. Here, too, the use of a very thin chamber or the use of a barrier 27 will prevent cross-coupling, i.e., undesired pressure surges, to travel through chambers $X_{aa}$ or $Y_{aa}$.

Figure 3:
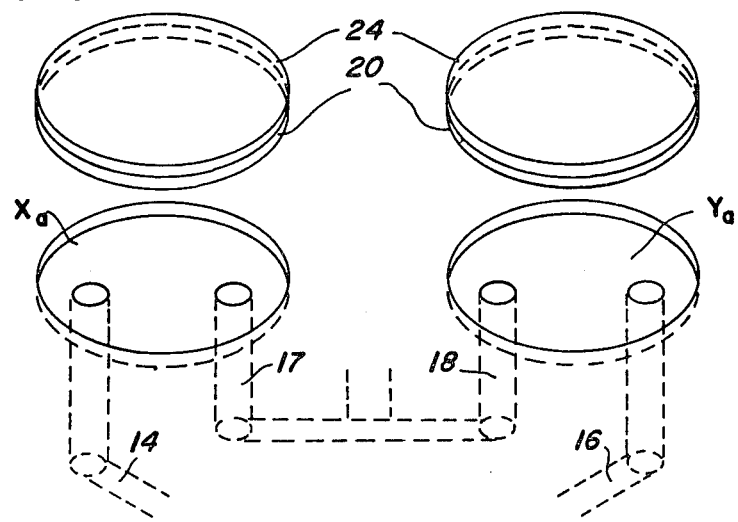
FIGS. 3-5 show exploded views of various embodiments of transducer chamber designs in accordance with the present invention.
Figure 4:
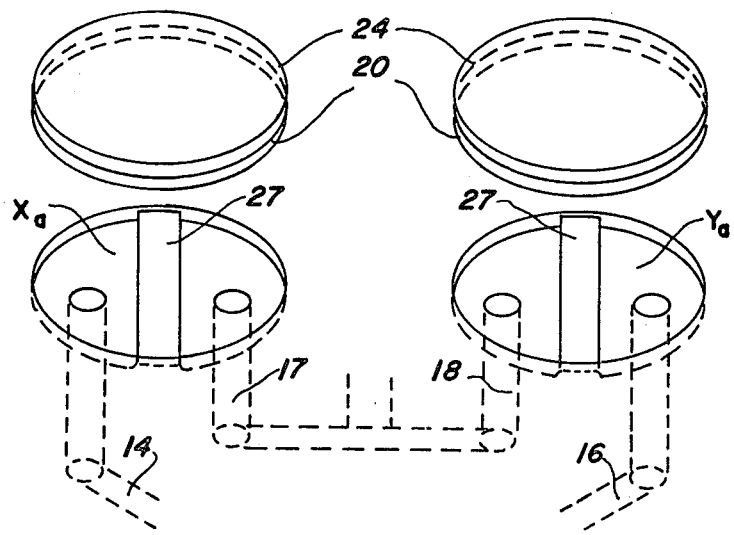
Figure 5:
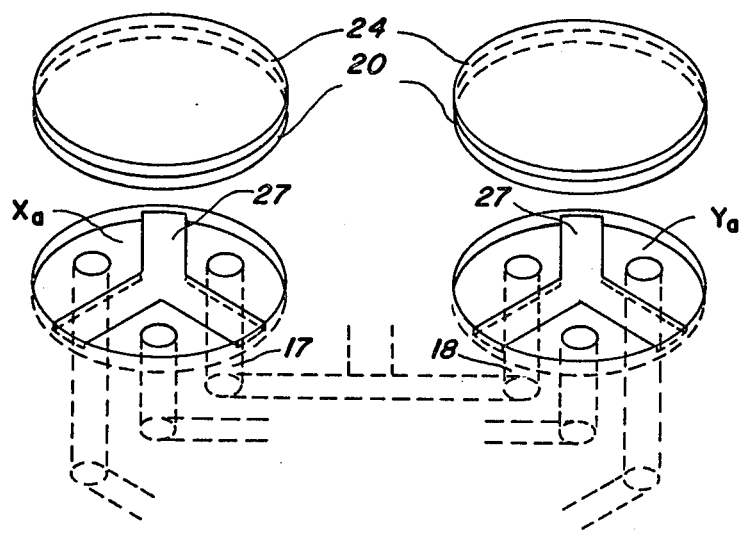

FIGS. 3–5 are exploded views representing varying embodiments of the present invention. Those elements which are the same as in the embodiment of FIG. 1 are given the same reference numerals. Layers 22 and 26 have been deleted for ease of drawing. FIG. 3 represents a chamber which has been made particularly thin to provide fluid impedance or resistance to pressure surges being transmitted through the chamber. FIG. 4 shows the use of a barrier 27 for a simple array system as described below. FIG. 5 shows how a barrier may be designed for a more complicated system.

In order to more clearly explain the advantages of the present invention, it is believed that a brief description of the system in which the present invention may be utilized is desirable.

FIG. 6 illustrates a piezoelectric member 22 electrically connected to a typical electronic driver, which is in this exemplary instance an NPN type transistor in an emitter follower configuration driven between a non-conductive state and a state of saturated conduction in response to positive-going pulse-like input signals supplied to the base of the transistor. All of the electronic drivers are electrically connected to their respective piezoelectric members in the same manner.

The above invention has specific utilization in a jet array system where a large number of jets are utilized or in a dense linear jet array. This will become apparent from the following discussion.

It is well known in the electrical engineering art that if two independent stimulators are required to effect stimulation of a device and if time sequencing is permitted, then the number required is only twice the square root of the number of stimulated devices. For example, only 120 stimulators are needed for 3600 stimulated devices, and only 128 stimulators are required for 4096 stimulated devices. This principle is visualized most readily by use of a matrix array as illustrated in FIG. 7. A plurality of electrical stimulators or input drivers $X_1$, $X_2$ and $X_3$ are arranged along an "X" coordinate while a plurality of electrical stimulators or drivers $Y_1$, $Y_2$ and $Y_3$ are arranged along the "Y" coordinate. The six stimulators or drivers are electrically connected at nine intersections with the intersections representing stimulated devices $X_1$, $Y_1$; $X_1$, $Y_2$; $X_1$, $Y_3$; $X_2$, $Y_1$; $X_2$, $Y_2$; $X_2$, $Y_3$; $X_3$, $Y_1$; $X_3$, $Y_2$ and $X_3$, $Y_3$. Activation of any one stimulator by itself will not activate any of the stimulated devices. However, activation of any two stimulators on different coordinates will activate a stimulated device. For instance, stimulated device $X_1$, $Y_2$ will be activated when stimulators or drivers $X_1$ and $Y_2$ are actuated.

Referring now to FIG. 8, a schematic fluid circuit is illustrated applying the above described concepts to an array of nine ink jets, 28, 30, 32, 34, 36, 38, 40, 42 and 44, each of which has two pressure passages 14 and 16 and an outlet orifice 12. Six electrical input drivers, $X_1$, $X_2$, $X_3$, $Y_1$, $Y_2$ and $Y_3$ are electrically connected to a piezoelectric member 20 of transducer chambers $X_a$, $X_b$, $X_c$, $Y_a$, $Y_b$, $Y_c$, respectively, by a respective one of electrical lines 46, 48, 50, 52, 54 and 56. The fluid replenishing passages 17 and 18 are communicated to a flexible bag fluid supply reservoir 58 and conduit 60.

A conduit 62 communicates transducer chamber $X_a$ with pressure inlets 14 of jets 28, 30 and 32; conduit 64 communicates transducer chamber $X_b$ with pressure inlets 14 of jets 34, 36 and 38; conduit 66 communicates transducer chamber $X_c$ with pressure inlets 14 of jets 40, 42 and 44; conduit 68 communicates transducer chamber $Y_a$ with pressure inlets 16 of jets 28, 34 and 40; conduit 70 communicates transducer chamber $Y_b$ with pressure inlets 16 of jets 30, 36 and 42; and conduit 72 communicates transducer chamber $Y_c$ with pressure inlets 16 of jets 32, 38 and 44. It can be seen with the degree of interconnection required for even the simple system described here that the prevention of cross-talk is very important.

Although specific embodiments have been described above, modifications can be made to the present invention and yet be included within the scope of the present invention. For example, the displacement devices, instead of being piezoelectric crystals, could be magnetostrictive, electromagnetic or electrostatic transducers.

What is claimed is:

1. A multiple ink jet assembly comprising:
   a fluid reservoir for containing a fluid;
   a plurality of compressible chamber means for holding fluid and including means for rapidly decreasing the volume of said chamber means in response to a predetermined signal, said chamber means being connected by fluid passages to said fluid reservoir; and
   a plurality of orifices, each of said orifices being connected to at least two chamber means by fluid passages wherein each of said chamber means is adapted to restrict the passage of a pressure pulse therethrough.

2. The assembly of claim 1 wherein said chamber means are made relatively thin to restrict the passage of a pressure pulse therethrough.

3. The assembly of claim 1 wherein said chamber means include barrier means for restricting the passage of a pressure pulse therethrough.

* * * * *